(12) United States Patent
Sakurai et al.

(10) Patent No.: US 9,422,461 B2
(45) Date of Patent: Aug. 23, 2016

(54) PRESSURE SENSITIVE ADHESIVE AND ADHESIVE TAPE

(75) Inventors: Aizoh Sakurai, Tokyo (JP); Kosuke Sugawa, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/990,822

(22) PCT Filed: Dec. 1, 2011

(86) PCT No.: PCT/US2011/062870
§ 371 (c)(1),
(2), (4) Date: May 31, 2013

(87) PCT Pub. No.: WO2012/075271
PCT Pub. Date: Jun. 7, 2012

(65) Prior Publication Data
US 2013/0251991 A1 Sep. 26, 2013

(30) Foreign Application Priority Data
Dec. 3, 2010 (JP) .................................. 2010-270589

(51) Int. Cl.
| | | |
|---|---|---|
| *C09J 7/02* | (2006.01) | |
| *B32B 7/12* | (2006.01) | |
| *C09J 133/14* | (2006.01) | |
| *C09J 133/08* | (2006.01) | |
| *C09J 133/26* | (2006.01) | |
| *B32B 5/02* | (2006.01) | |
| *B32B 27/08* | (2006.01) | |
| *B32B 27/12* | (2006.01) | |
| *B32B 27/18* | (2006.01) | |
| *B32B 27/30* | (2006.01) | |
| *B32B 27/40* | (2006.01) | |

(52) U.S. Cl.
CPC .............. *C09J 7/0217* (2013.01); *B32B 5/022* (2013.01); *B32B 7/12* (2013.01); *B32B 27/08* (2013.01); *B32B 27/12* (2013.01); *B32B 27/18* (2013.01); *B32B 27/308* (2013.01); *B32B 27/40* (2013.01); *C09J 133/08* (2013.01); *C09J 133/14* (2013.01); *C09J 133/26* (2013.01); *B32B 2260/046* (2013.01); *B32B 2262/02* (2013.01); *B32B 2262/04* (2013.01); *B32B 2262/065* (2013.01); *B32B 2262/101* (2013.01); *B32B 2266/02* (2013.01); *B32B 2307/306* (2013.01); *B32B 2307/542* (2013.01); *B32B 2405/00* (2013.01); *B32B 2605/08* (2013.01); *Y10T 428/2891* (2015.01); *Y10T 428/31928* (2015.04)

(58) Field of Classification Search
None
See application file for complete search history.

(56) References Cited

U.S. PATENT DOCUMENTS

| | | | |
|---|---|---|---|
| 4,364,972 A | 12/1982 | Moon | |
| 5,252,395 A * | 10/1993 | Maruoka et al. | 428/355 AC |
| 5,334,686 A | 8/1994 | Ando et al. | |
| 5,612,136 A | 3/1997 | Evaraerts et al. | |
| 6,777,079 B2 | 8/2004 | Zhou et al. | |
| 2009/0233093 A1 | 9/2009 | Toyama et al. | |
| 2011/0111660 A1* | 5/2011 | Morino et al. | 442/149 |

FOREIGN PATENT DOCUMENTS

| | | |
|---|---|---|
| EP | 2 006 715 | 12/2008 |
| JP | H06-166858 | 6/1994 |
| WO | WO 2009031421 A1 * | 3/2009 |

OTHER PUBLICATIONS

PCT International Search Report from PCT/US2011/062870 mailed on Apr. 4, 2012, 3 pages.

* cited by examiner

*Primary Examiner* — Scott R Walshon
(74) *Attorney, Agent, or Firm* — Dena M. Ehrich; Philip Y. Dahl

(57) ABSTRACT

There is provided a pressure sensitive adhesive displaying sufficient adhesive force to the surface of PMMA under a wide range of temperatures including ambient, low, and high temperatures, and also an adhesive tape having an adhesive layer including the pressure sensitive adhesive. There is provided a pressure sensitive adhesive comprising a polymer obtained by polymerizing 100 mass parts of a monomer mixture comprising: a monomer component 1 comprising an acrylate mixture selected from an aliphatic alkyl(meth)acrylate having a carbon number of 4-6 and an aliphatic alkyl (meth)acrylate having a carbon number of 7-12; a monomer component 2 comprising an amide group-containing vinyl monomer; a monomer component 3 comprising an ester of a non-tertiary aromatic alcohol and (meth)acrylic acid, or an ester of a non-tertiary alicyclic alcohol and (meth)acrylic acid; and a monomer component 4 comprising (meth)acrylic acid.

8 Claims, No Drawings

PRESSURE SENSITIVE ADHESIVE AND ADHESIVE TAPE

FIELD OF INVENTION

The present disclosure relates to a pressure sensitive adhesive. Additionally, the present disclosure relates to an adhesive tape including an adhesive layer which contains a pressure sensitive adhesive; and a structure.

BACKGROUND

Polymethylmethacrylate (PMMA) is used frequently as a material for visors (side visors and door visors) that are automotive exterior parts and that are, for example, attached to an upper part of automobile doors. When joining this material using an adhesive, the surface of the material is often coated with a primer as a pretreating agent because sufficient adhesion cannot be obtained with the adhesive alone.

However, in general, primers contain volatile organic solvents and, because of this, there is a problem that the application working environment is worsened, and that the environment of the area (i.e. inside an automobile or room, etc.) where the material that the primer has been applied to is to be used is worsened due to the solvents volatilizing when applying the primer and after application. Furthermore, there are also problems that applying the primer requires a set amount of labor time, variations in application and forgetting to apply by workers, and variations in the appearance of applied surfaces due to primer contamination.

Pressure-sensitive adhesives that use an acrylic polymer including a monomer that contains an acrylic monomer, an N.N-disubstituted (meth)acrylamide, and an acidic group; and another monomer that is copolymerizable therewith are known as pressure-sensitive adhesives that display excellent adhesive properties to various surfaces and superior wearability as shown for example in Japanese Unexamined Patent Application Publication H06-166857.

Additionally, pressure-sensitive adhesives that use an acrylic polymer including a monomer that contains an acrylic monomer, an N-vinyl cyclic amide, and an acidic group; and another monomer that is copolymerizable therewith are known as pressure-sensitive adhesives that have superior adhesive holding properties and superior adhesion properties at high temperatures as shown for example in Japanese Unexamined Patent Application Publication H06-166858.

SUMMARY

A pressure-sensitive adhesive that displays sufficient adhesive force to the surface of PMMA under a wide range of temperatures does not exist, and, therefore, such a pressure sensitive adhesive and an adhesive tape are desired.

In one aspect, the present disclosure provides a pressure sensitive adhesive displaying sufficient adhesive force to the surface of PMMA, which is a material used for visors, an automotive exterior part, under a wide range of temperatures including ambient, low, and high temperatures, and also an adhesive tape having an adhesive layer including the pressure sensitive adhesive.

In another aspect, the present disclosure provides a pressure sensitive adhesive including a polymer obtained by polymerizing 100 mass parts of a monomer mixture containing: monomer component (1): 46 to 60 mass parts of an acrylate mixture selected from an aliphatic alkyl(meth)acrylate having a carbon number of 4-6 and an aliphatic alkyl(meth)acrylate having a carbon number of 7-12; monomer component (2): 22 to 36 mass parts of an amide group-containing vinyl monomer; monomer component (3): 10 to 30 mass parts of an ester of a non-tertial aromatic alcohol and (meth)acrylic acid, or an ester of a non-tertial alicyclic alcohol and (meth)acrylic acid; and monomer component (4): 0 to 3 mass parts of (meth)acrylic acid.

In yet another aspect, the present disclosure provides an adhesive tape including a base material layer and an adhesive layer that includes the pressure sensitive adhesive.

In another aspect, the present disclosure provides a structure including a base material layer, an adhesive layer that includes the pressure sensitive adhesive, and a polymethylmethacrylate automotive exterior part.

DETAILED DESCRIPTION OF THE INVENTION

The presently disclosed pressure sensitive adhesive provides displays having sufficient adhesive force to the surface of PMMA under a wide range of temperatures including ambient, low, and high temperatures; adhesive tapes having an adhesive layer including the pressure sensitive adhesive; and structures in which the adhesive tape is affixed to an automotive exterior part.

The pressure sensitive adhesive of the present disclosure includes a polymer obtained by polymerizing 100 mass parts of a monomer mixture containing: an acrylate mixture selected from an aliphatic alkyl(meth)acrylate having a carbon number of 4-6 and an aliphatic alkyl(meth)acrylate having a carbon number of 7-12 (monomer component (1)); an amide group-containing vinyl monomer (monomer component (2)); an ester of a non-tertial aromatic alcohol and (meth)acrylic acid, or an ester of a non-tertial alicyclic alcohol and (meth)acrylic acid (monomer component (3)); and (meth)acrylic acid (monomer component (4)).

In this specification, "(meth)acryl" means either "acryl" or "methacryl".

In this specification, "tertial" refers to "tertiary" and "non-tertial" means "non-tertiary".

Monomers

"Monomer component (1)" refers to an acrylate mixture including an acrylate selected from an aliphatic alkyl(meth)acrylate having a carbon number of 4-6 and an aliphatic alkyl(meth)acrylate having a carbon number of 7-12.

"An acrylate mixture including an acrylate selected from an aliphatic alkyl(meth)acrylate having a carbon number of 4-6 and an aliphatic alkyl(meth)acrylate having a carbon number of 7-12" refers to a mixture including one or more acrylate monomers selected from aliphatic alkyl(meth)acrylates having a carbon number of 4-6 and one or more acrylate monomers selected from aliphatic alkyl(meth)acrylates having a carbon number or 7-12.

"An aliphatic alkyl(meth)acrylate having a carbon number of 4-6" refers to an ester of acrylic acid or methacrylic acid and a fatty alcohol having a carbon number of 4-6. "An aliphatic alkyl(meth)acrylate having a carbon number of 7-12" refers to an ester of acrylic acid or methacrylic acid and a fatty alcohol having a carbon number of 7-12.

Examples of the aliphatic alkyl(meth)acrylate having a carbon number of 4-6 include n-butyl acrylate (BA), isobutyl acrylate, pentyl acrylate, and hexyl acrylate. Of these, n-butyl acrylate (BA) is an example of a preferable aliphatic alkyl (meth)acrylate having a carbon number of 4-6.

Additionally, examples of the aliphatic alkyl(meth)acrylate having a carbon number of 7-12 include 2-ethylhexyl acrylate (2EHA), isooctyl acrylate (IOA), n-nonyl(meth) acrylate, isononyl acrylate, decyl(meth)acrylate, isodecyl (meth)acrylate, lauryl(meth)acrylate, isododecyl(meth)acrylate, and the like. Of these, 2-ethylhexyl acrylate (2EHA) is an example of a preferable aliphatic alkyl(meth)acrylate having a carbon number of 7-12.

Additionally, specific examples of the acrylate mixture including the aliphatic alkyl(meth)acrylate having a carbon number of 4-6 and the aliphatic alkyl(meth)acrylate having a carbon number of 7-12 include a mixture of n-butyl acrylate (BA) and 2-ethylhexyl acrylate (2EHA).

A content of the monomer component (1) can be set at about 46 to about 60 mass parts, about 46 to about 53 mass parts, or about 47 to about 60 mass parts when the monomer mixture, or, in other words, a total of the mixture constituted by the monomer component (1), the monomer component (2), the monomer component (3), and the monomer component (4) (hereinafter referred to simply as "the monomer mixture") is 100 mass parts.

Alternatively, when using a monomer expressed by general formula 1 as the monomer component (2), the content of the monomer component (1) can be set at about 46 to about 53 mass parts or about 47 to about 52 mass parts.

Additionally, when using a N-vinyl cyclic amide monomer as the monomer component (2), the content of the monomer component (1) can be set at about 47 to about 60 mass parts, about 47 to about 56 mass parts, or about 50 to about 56 mass parts.

A compounding ratio (mass ratio) of the aliphatic alkyl (meth)acrylate having a carbon number of 4-6 to the aliphatic alkyl(meth)acrylate having a carbon number of 7-12 can be set as desired. When using the monomer expressed by general formula 1 in the monomer mixture, the compounding ratio thereof, rather, [aliphatic alkyl(meth)acrylate having a carbon number of 4-6]:[aliphatic alkyl(meth)acrylate having a carbon number of 7-12] can be set at 3:7 to 7:3 or 3.5:6.5 to 6.5:3.5. When using N-vinyl cyclic amide monomer in the monomer mixture, the compounding ratio can be set at 2.5:7.5 to 10:0, or 5:5 to 10:0.

In some embodiments, the monomer component (1) consists essentially of 46 to 60 mass parts of an acrylate mixture selected from an aliphatic alkyl(meth)acrylate having a carbon number of 4-6 and an aliphatic alkyl(meth)acrylate having a carbon number of 7-12. In some embodiments, the monomer component (1) includes 46 to 60 mass parts of an acrylate mixture selected from an aliphatic alkyl(meth)acrylate having a carbon number of 4-6 and an aliphatic alkyl (meth)acrylate having a carbon number of 7-12, among other things.

"Monomer component (2)" refers to an amide group-containing vinyl monomer.

"Amide group-containing vinyl monomer" refers to a monomer including —NC(O)— (amide bond) on a sidechain of a vinyl monomer.

Examples of the amide group-containing vinyl monomer include monomers expressed by general formula 1: $CHR=CH—C(O)—N(R^1)R^2$ [wherein R is hydrogen or methyl group; $R^1$ and $R^2$ are selected from hydrogen and linear or branched alkyl groups having a carbon number of 1-4, wherein $R^1$ and $R^2$ are not both hydrogen at the same time]; and N-vinyl cyclic amide monomers.

Specific examples of the monomer expressed by the general formula 1 include N,N-dimethylacrylamide (nnDMA), N,N-diethylacrylamide (nnDEA), and N,N-dimethylmethacrylamide. Of these, N,N-dimethylacrylamide (nnDMA) is an example of a favorable monomer.

Additionally, specific examples of the N-vinyl cyclic amide monomer include N-vinylcaprolactam (NVC), N-vinylpyrrolidone (NVP), and the like. Of these, N-vinylpyrrolidone (NVP) is an example of a preferable N-vinyl cyclic amide monomer.

A content of the monomer component (2) can be set at about 22 to about 36 mass parts or about 26 to about 34 mass parts when the total of the monomer mixture is 100 mass parts.

When the monomer expressed by the general formula 1 is used as the amide group-containing vinyl monomer, the content of the monomer component (2) can be set at about 26 to about 34 mass parts when the total of the monomer mixture is 100 mass parts.

In some embodiments, monomer component (2) consists essentially of 22 to 36 mass parts of an amide group-containing vinyl monomer. In some embodiments, monomer component (2) comprises 22 to 36 mass parts of an amide group-containing vinyl monomer, among other things.

"Monomer component (3)" refers to an ester of a non-tertial aromatic alcohol and (meth)acrylic acid, or an ester of a non-tertial alicyclic alcohol and (meth)acrylic acid.

"Ester of a non-tertial aromatic alcohol and (meth)acrylic acid" refers to an ester of acrylic acid or methacrylic acid and a non-tertial aromatic alcohol, in other words, a primary or secondary aromatic alcohol; wherein the monomer is such that a Tg of a homopolymer thereof is −25° C. or higher. Specifically, examples include benzyl acrylate (BzA), benzyl methacrylate, and the like. Of these, benzyl acrylate (BzA) is an example of a preferable ester of a non-tertial aromatic alcohol and (meth)acrylic acid.

"Ester of a non-tertial alicyclic alcohol and (meth)acrylic acid" refers to an ester of acrylic acid or methacrylic acid and a non-tertial alicyclic alcohol, in other words, a primary or secondary alicyclic alcohol; wherein the monomer is such that a Tg of a homopolymer thereof is −25° C. or higher. Specific examples that can be used include isobornyl acrylate (IBA), isobornyl methacrylate, cyclohexyl acrylate (CHA), cyclohexyl methacrylate, dicyclopentanyl acrylate, dicyclopentanyl methacrylate, dicyclopentenyl acrylate, dicyclopentenyl methacrylate, and the like. Of these, cyclohexyl acrylate (CHA) is an example of a preferable ester of a non-tertial alicyclic alcohol and (meth)acrylic acid.

A content of the monomer component (3) can be set at about 10 to about 30 mass parts or about 10 to about 20 mass parts when the total of the monomer mixture is 100 mass parts.

In some embodiments, monomer component (3) consists essentially of 10 to 30 mass parts of an ester of a non-tertial aromatic alcohol and (meth)acrylic acid, or an ester of a non-tertial alicyclic alcohol and (meth)acrylic acid. In some embodiments, monomer component (3) comprises 10 to 30 mass parts of an ester of a non-tertial aromatic alcohol and (meth)acrylic acid, or an ester of a non-tertial alicyclic alcohol and (meth)acrylic acid, among other things.

"Monomer component (4)" refers to (meth)acrylic acid.

"(Meth)acrylic acid" refers to acrylic acid or methacrylic acid. A content of the monomer component (4) can be set at about 0 to about 3 mass parts or about 0 to about 1 mass parts when the total of the monomer mixture is 100 mass parts.

In some embodiments, monomer component (4) consists essentially of 0 to 3 mass parts of (meth)acrylic acid. In some embodiments, monomer component (4) comprises 0 to 3 mass parts of (meth)acrylic acid, among other things.

Polymerization Initiator

A conventionally used polymerization initiator can be used as desired in the pressure sensitive adhesive of the present disclosure.

Specific examples include photoinitiators such as 1-hydroxycyclohexyl phenyl ketone, 2,2-dimethoxy-2-phenyl acetophenone, 2-hydroxy-2-methyl-1-phenyl-propane-1-one, 2-methyl-1-[4-(methylthio)phenyl]-2-morpholinopropane-1-one, 2-benzyl-2-dimethylamino-1-(4-morpholinophenyl)-butane-1-one, 2-chlorothioxanthone, 2,4-dimethylthioxanthone, 2,4-diisopropylthioxanthone, isopropylthioxanthone, 2,4,6-trimethylbenzoyl diphosphine oxide, bis((2,6-dimethoxybenzoyl)-2,4,4-trimethylpentyl phosphine oxide, and the like; and thermal initiators such as organic peroxides including benzoyl peroxide, lauroyl peroxide, and bis(4-tertiary butylcyclohexyl)peroxydicarbonate; and azo polymerization initiators such as 2,2'-azobisisobutyronitrile, 2,2'-azobis-2-methylbutyronitrile, 4,4'-azobis-4-cyanovaleric acid, 2,2'-azobis(2-methylolpropionic acid)dimethyl, 2,2'-azobis(2,4-dimethylvaleronitrile), azobis 2,4-dimethylvaleronitrile (AVN), and the like. A single polymerization initiator or two or more polymerization initiators can be used.

A content of the polymerization initiator can be selected as desired according to the type of polymerization initiator. For example, when using a photoinitiator, the content of the polymerization initiator can be set at about 0.05 mass parts to about 1.0 mass part or about 0.05 mass parts to about 0.3 mass parts when the monomer mixture is 100 mass parts. When using a thermal initiator, the content can be set at about 0.05 mass parts to about 5.0 mass parts when the monomer mixture is 100 mass parts. By setting the content to be within such a range, a greater adhesive force, and particularly, a high temperature debonding force and a post-thermal aging debonding force can be obtained.

Crosslinking Agent

The pressure sensitive adhesive of the present disclosure may further include a conventionally used crosslinking agent. Examples include multifunctional acrylates, isocyanate crosslinking agents, epoxy crosslinking agents, oxazoline crosslinking agents, aziridine crosslinking agents, metal chelate crosslinking agents, melamine resin crosslinking agents, peroxide crosslinking agents, and the like.

A content of the crosslinking agent is not particularly limited, and, for example, can be set at about 0.01 mass parts to about 0.5 mass parts when the monomer mixture is 100 mass parts.

Additives

The pressure sensitive adhesive of the present disclosure can further include conventionally used additives such as plasticizers, fillers, anti-aging agents, adhesion promoters (i.e. chlorinated polyolefin, etc.), ultraviolet light absorbers, pigments, and the like. Method for Manufacturing the Pressure Sensitive Adhesive The pressure sensitive adhesive of the present disclosure includes a polymer that is obtained by polymerizing the monomer mixture, or, rather, the mixture of the monomers.

This polymer can be obtained by, for example, mixing a photoinitiator and/or, optionally, conventionally known additives with the monomer mixture; removing oxygen by thoroughly substituting the monomer using nitrogen gas; and, thereafter, polymerizing by irradiating using ultraviolet radiation, X-rays, gamma radiation, or electron beams. Alternatively, the polymer can be obtained by first adding a portion of the photoinitiator to the monomer mixture; fabricating a prepolymer by irradiating the mixture with, for example, ultraviolet radiation so that a viscosity thereof is about 1000 cps to about 5000 cps; and, thereafter, polymerizing by further addition of the photoinitiator and irradiating using, for example, ultraviolet radiation.

Alternatively, the polymer can be obtained by first filling a pressure bottle with the monomer mixture and a conventionally known solvent such as ethyl acetate, or the like; then, after adding a polymerization initiator, removing oxygen by thoroughly substituting the monomer using nitrogen gas; and heating and polymerizing.

Adhesive Tape

The adhesive tape of the present disclosure includes a base material layer and an adhesive layer that includes the pressure sensitive adhesive. The adhesive tape can be configured so that the adhesive layer is laminated on only one side or on both sides of the base material. Alternatively, the adhesive tape can be configured by laminating an adhesive layer constituted by the pressure sensitive adhesive of the present disclosure on a surface of a side of a base material, which has been provided in advance with a layer of an adhesive on one side, opposite said side having the layer of the adhesive. Additionally, optionally, the adhesive tape may have a layer having other functions such as a primer layer, and the like. Furthermore, a conventionally used debonding liner may be laminated on the surface of the adhesive layer.

A conventionally used film or sheet having a foam can be used as the base material layer. The sheet having a foam itself may have adhesive properties. Examples of films that can be used as the film include polyethylene films, polypropylene films, polyester films, polycarbonate films, polyvinylchloride films, polyvinylidene chloride films, polystyrene films, polyamide films, and the like. Additionally, examples of sheets that can be used as the sheet having a foam include acrylic foam sheets, polyethylene foam sheets, chloroprene foam sheets, urethane foam sheets, and the like. Specifically, for example, acrylic foam tape (GT7108, manufactured by Sumitomo 3M) and the like can be used. A thickness of the base material layer can be set as desired based on the intended application of the adhesive tape and is not limited, and, for example, can be set at about 30 μm to about 4 mm.

In some embodiments, a conventionally used nonwoven can be used as the base material layer. Examples of nonwovens that can be used include nonwovens formed from polyesters such as polyethylene terephthalate (PET), polyolefins such as high density polyethylene or polypropylene, nylon, polyvinylalcohol, polyacrylonitrile, cellulosic pulp natural fibers such as cotton or hemp, rayon, heat resistant synthetic fibers, and heat resistant fibers such as polyamide fibers or glass fibers. A thickness of the nonwoven is not particularly limited, and, for example, can be set at about 5 μm to about 100 μm.

The adhesive layer includes the pressure sensitive adhesive of the present disclosure. A thickness of the adhesive layer can be set as desired based on the material used for the base material layer and the intended application of the adhesive tape and is not limited, and, for example, can be set at about 10 μm to about 500 μm.

The adhesive tape can be produced through a conventionally known process. For example, the adhesive layer can be obtained by sandwiching the monomer mixture constituting the pressure sensitive adhesive of the present disclosure between two layers of a film and curing. The adhesive tape is obtained by peeling the film off of one side of the obtained adhesive layer and laminating that surface onto the base material layer. Here, if a film with a surface that has been subjected to a peeling treatment is used, handling will be facilitated when peeling the film from the adhesive layer and laminating onto the base material layer. Additionally, a primer may be applied to the adhesive layer surface or the base material layer surface when laminating the adhesive layer onto the base material layer. Furthermore, a double-sided adhesive tape can be obtained by laminating the adhesive layer onto both sides of the base material layer.

The pressure sensitive adhesive of the present disclosure can be used alone as a pressure sensitive adhesive, or can be laminated onto a base material layer as described above for use as an adhesive tape. Moreover, the pressure sensitive adhesive of the present disclosure displays sufficient adhesive force to surfaces of materials such as, for example, polymethylmethacrylate under a wide range of temperatures including ambient, low, and high temperatures. Therefore, the pressure sensitive adhesive and the adhesive tape using the pressure sensitive adhesive can be used to bond automotive exterior parts, particularly polymethylmethacrylate visors (side visors and door visors) to the body of an automobile.

Structure

The structure of the present disclosure includes the base material layer, the adhesive layer that is constituted by the pressure sensitive adhesive, and a polymethylmethacrylate automotive exterior part. Particularly, a structure in which the base material layer, the adhesive layer, and the polymethylmethacrylate are laminated in this order is preferable.

The same material used for the base material layer of the adhesive tape can be used for the base material layer.

The adhesive layer is preferably provided on both sides of the base material layer. Moreover, at least one side of the adhesive layer can be configured to be an adhesive layer constituted by the pressure sensitive adhesive of the present disclosure.

Examples of polymethylmethacrylate automotive exterior parts include visors (side visors and door visors) that are attached to an upper part of automobile doors and the like.

The structure can be obtained by adhering the surface of the adhesive tape described above that has the adhesive layer to a surface of the automotive exterior part. In some embodiments, when the adhesive tape has the adhesive layer on both sides, the structure can be obtained by adhering one of the sides having the adhesive layer to the surface of the automotive exterior part.

Additionally, the structure is integrated with the adhesive tape that displays sufficient adhesive force to the surface of PMMA under a wide range of temperatures including ambient, low, and high temperatures. Therefore, by adhering the adhesive layer of the side opposite the PMMA to the body of an automobile, the structure can be used as a part that is firmly attachable to an automobile body.

EXAMPLES

Explanations of abbreviations and manufacturers of the components used in the examples are as follows.

BA: n-butyl acrylate (manufactured by Mitsubishi Chemical Corporation)

2EHA: 2 ethylhexyl acrylate (manufactured by Nippon Shokubai Co., Ltd.)

nnDMA: Dimethylacrylamide (manufactured by Kohjinsha, Co., Ltd.)

NVP: n-vinyl-2-pyrrolidone (manufactured by Nippon Shokubai Co., Ltd.)

NVC: n-vinyl-caprolactam (manufactured by BASF)

BzA: Benzyl acrylate (manufactured by Osaka Organic Chemical Industry Ltd.)

CHA: Cyclohexyl acrylate (manufactured by Osaka Organic Chemical Industry Ltd.)

AA: Acrylic acid (manufactured by To a Gosei Co. Ltd.)

Irgacure 651: 2,2-dimethoxy-1,2-diphenylethane-1-one (manufactured by Chiba Specialty Chemicals Co., Ltd.)

HDDA: 1,6-hexanediol diacrylate (manufactured by Kyoeisha Chemical Co., Ltd)

V-65: 2,2'-azobis(2,4-dimethylvaleronitrile) (manufactured by Wako Pure Chemical Industries, Ltd.)

Bis Aziridine Isophthanoyl bis-2-methylaziridine

Manufacture of the Pressure Sensitive Adhesive and the Adhesive Tape by Ultraviolet Radiation Polymerization Examples 1 to 22 and 24 and Comparative Examples 1 to 11

Prepolymers were fabricated by adding the amounts shown in the upper row of the photoinitiator to the monomer components (1) to (4) shown in Tables 1 to 4. After removing oxygen by thoroughly substituting using nitrogen gas, the mixture was irradiated with ultraviolet radiation so that that a viscosity thereof was about 1000 cps to about 5000 cps. Thereafter, the amounts shown in the lower row of the photoinitiator and the crosslinking agent were added and a syrup solution was obtained.

The obtained syrup solution was placed on a peeling treated PET film (manufactured by Mitsubishi Chemical Corporation) having a thickness of 50 μm. Another PET film of the same type was placed thereon, and the syrup solution was applied using a blade coating process while being sandwiched by the two layers of film. Thereafter, curing was performed by irradiating with ultraviolet radiation having a wavelength of 300 to 400 nm and an intensity of 0.5 to 7.0 mW/cm$^2$ for six minutes and the pressure sensitive adhesive was produced. The thickness post-curing was 100 μm.

One side of the PET film of the obtained pressure sensitive adhesive was peeled off, an acrylic foam tape (GT7108, manufactured by Sumitomo 3M) was laminated onto the exposed surface of the pressure sensitive adhesive, and the adhesive tape was obtained.

Manufacture of the Pressure Sensitive Adhesive and the Adhesive Tape by Thermal Polymerization Example 23

A pressure bottle was filled with 21 parts of 2 ethylhexyl acrylate, 31 parts of butyl acrylate, 20 parts of benzyl acrylate, 26 parts of n-vinylpyrrolidone, 2 parts of acrylic acid, and 185.7 parts of ethyl acetate. 0.1 parts of a polymerization initiator (V-65, manufactured by Wako Pure Chemical Industries, Ltd.) were added, and after removing oxygen by nitrogen gas substitution (10 minutes) the pressure bottle was sealed and polymerized in a 50° C. water bath for 20 hours. An inherent viscosity of the obtained polymer solution was measured to be 1.36 dl/g using a Cannon-Fenske viscometer.

A bottle was filled with the obtained polymer solution and 0.2 parts of Isophthanoyl bis-2-methylaziridine (crosslinking agent) and mixed. The obtained solution was applied to a silicone treated PET film having a thickness of 50 μm using a blade coater, dried for 10 minutes in an oven at 100° C., and a pressure sensitive adhesive having a thickness of 65 μm was obtained. Thereafter, an acrylic foam tape (GT7108, manufactured by Sumitomo 3M) was laminated onto the exposed surface of the pressure sensitive adhesive, and the adhesive tape was obtained.

A PET film (treated with a primer commercially available under the trade designation "Primer K500" from 3M Company, St. Paul, Minn. USA) having a thickness of 50 μm was laminated onto the surface of the acrylic foam tape side of the adhesive tape obtained through the Examples and Comparative Examples and used for measuring peel force as described hereinafter. Measurements of gripping force were performed using the obtained adhesive tapes as samples.

Measurement 1: Measurement of Peel Force at Ambient Temperature (25° C.) with Regards to Polymethylmethacrylate A polymethylmethacrylate (PMMA) plate (100 mm×25 mm×2 mm; commercially available under the trade designation "ACRYPET$^M$ VH000" from Mitsubishi Rayon Co., Ltd.) was prepared as a test surface and was cleaned using isopropyl alcohol (IPA). After contact bonding the evaluatory samples (tape size: 12 mm×60 mm) fabricated according to the Examples and Comparative Examples described above using a 2 kg roller (one pass back and forth), the samples were left to rest for 24 hours at ambient temperature (25° C.). Thereafter, 180° peel strength (25° C., pulling speed: 50 mm/min) was measured using a tensile tester (commercially available under the trade designation "Tensilon RTC-1325A" from Orientec Co., Ltd.). The results are presented in the Tables.

Measurement 2: Measurement of Peel Force at High Temperature (80° C.) with Regards to Polymethylmethacrylate The evaluatory samples fabricated in Measurement 1 were left to rest for 30 min to 60 min at 80° C. Thereafter, 180° peel strength (80° C., pulling speed: 50 mm/min) was measured using a tensile tester (commercially available under the trade designation "Tensilon RTC-1325A"). The results are presented in the Tables.

Measurement 3: Measurement of Peel Force at Low Temperature (5° C.) with Regards to Polymethylmethacrylate The evaluatory samples fabricated in Measurement 1 were left to rest for 120 min at 5° C. Thereafter, 90° peel strength (5° C., pulling speed: 300 mm/min) was measured using a tensile tester (commercially available under the trade designation "Tensilon RTC-1325A"). The results are presented in the Tables.

Measurement 4: Measurement of Gripping Force at High Temperature (80° C.) with Regards to Polymethylmethacrylate A polymethylmethacrylate (PMMA) plate (100 mm×25 mm×2 mm; commercially available under the trade designation "ACRYPET$^M$ VH000") was prepared and was cleaned using isopropyl alcohol (IPA). A PMMA plate was adhered to the adhesive surface of the evaluatory side of the evaluatory sample for the gripping force measurements (tape size: 12 mm×25 mm) fabricated according to the Experiment Examples described above and, a cleaned SUS-304 plate (0.5 mm×30 mm×60 mm) was adhered onto the acrylic foam tape surface on the opposite side of the evaluatory sample. Then, contact bonding was performed using a 5 kg roller (one pass back and forth). After curing the obtained sample for 60 minutes in an oven at 80° C., a 500 g weight was hung from one end of the sample in the longitudinal direction so as to be at an angle of 2 degrees. The holding time (min) until the weight dropped was measured. The test was repeated three times and the average holding time was shown in the Tables.

"Mode" in the Tables indicates the failure mode, as visually observed, of the states of the evaluatory samples after each test. The state of each failure mode is as follows.

FB (foam splitbreak): State in which the base material layer (acrylic foam tape) aggregates and fails.

Specifically, a state in which the base material layer (acrylic foam tape) fails while the adhesive layer is adhered to the sample surface.

Pop: A state in which the evaluatory sample peels from the sample surface due to interfacial failure of the adhesive layer. Specifically, a state in which the base material layer (acrylic foam tape) and the adhesive layer are in an adhered state, and residue of the pressure sensitive adhesive cannot be confirmed on the sample surface visually or by touch.

TABLE 1

|  |  | Ex. 1 | Ex. 2 | Ex. 3 | Ex. 4 | Ex. 5 | Ex. 6 | Cex. 1 |
| --- | --- | --- | --- | --- | --- | --- | --- | --- |
| monomer (1) | BA | 32 | 30 | 28 | 26 | 27 | 25 | 23 |
|  | 2EHA | 21 | 21 | 21 | 21 | 21 | 21 | 21 |
| monomer (2) | DMAA | 26 | 28 | 30 | 32 | 32 | 34 | 36 |
|  | NVP |  |  |  |  |  |  |  |
| monomer (3) | BzA | 20 | 20 | 20 | 20 | 20 | 20 | 20 |
|  | CHA |  |  |  |  |  |  |  |
| monomer (4) | AA | 1 | 1 | 1 | 1 | 0 | 0 | 0 |
| Initiator | Irgacure 651 | 0.04 | 0.04 | 0.04 | 0.04 | 0.04 | 0.04 | 0.04 |
|  |  | 0.1 | 0.1 | 0.1 | 0.1 | 0.1 | 0.1 | 0.1 |
| crosslinker | HDDA | 0.08 | 0.08 | 0.08 | 0.08 | 0.06 | 0.06 | 0.06 |
| 180 deg. Peel at 25 dc (N/12 mm) |  | 17.5 | 18.3 | 23.3 | 22.5 | 21 | 22 | 23 |
| mode |  | pop | pop | pop | pop | pop | pop | pop |
| 180 deg. Peel at 80 dc (N/12 mm) |  | 18 | 18.6 | 14.5 | 14 | 14.5 | 13.5 | 13.5 |
| mode |  | pop | FB | FB | FB | FB | FB | FB |
| 180 deg. Peel at 5 dc (N/12 mm) |  | 4.6 | 2.8 | 2.8 | 2.8 | 2.3 | 1.2 | 0.4 |
| mode |  | pop | pop | pop | pop | pop | pop | pop |
| Static shear test (min/12 mm × 25 mm) |  | 4031 | >10080 | >10080 | >10080 | >10080 | >10080 | >10080 |
| mode |  | pop | pop | pop | pop | — | — | — |

TABLE 2

|  |  | Cex. 2 | Cex. 3 | Ex. 7 | Ex. 8 | Ex. 9 | Ex. 10 |
| --- | --- | --- | --- | --- | --- | --- | --- |
| monomer (1) | BA | 38 | 36 | 34 | 34 | 32 | 30 |
|  | 2EHA | 21 | 21 | 21 | 20 | 21 | 21 |
| monomer (2) | DMAA |  |  |  |  |  |  |
|  | NVP | 20 | 22 | 24 | 26 | 26 | 28 |
| monomer (3) | BzA | 20 | 20 | 20 | 20 | 20 | 20 |
|  | CHA |  |  |  |  |  |  |

TABLE 2-continued

| | | | | | | | |
|---|---|---|---|---|---|---|---|
| monomer (4) | AA | 1 | 1 | 1 | 0 | 1 | 1 |
| Initiator | Irgacure 651 | 0.04 | 0.04 | 0.04 | 0.04 | 0.04 | 0.04 |
| | | 0.1 | 0.1 | 0.1 | 0.1 | 0.1 | 0.1 |
| crosslinker | HDDA | 0.06 | 0.06 | 0.06 | 0.06 | 0.06 | 0.06 |
| 180 deg. Peel at 25 dc (N/12 mm) | | 28.5 | 23.8 | 26 | 25.3 | 26.8 | 22.1 |
| mode | | pop | pop | pop | pop | pop | pop |
| 180 deg. Peel at 80 dc (N/12 mm) | | 16.6 | 24.3 | 20.8 | 14.8 | 13.3 | 13.8 |
| mode | | pop | pop | pop | FB | FB | FB |
| 180 deg. Peel at 5 dc (N/12 mm) | | 11.1 | 8.9 | 6.9 | 7.2 | 5.1 | 5.7 |
| mode | | pop | pop | pop | pop | pop | pop |
| Static shear test (min/12 mm × 25 mm) | | 2831 | 2531 | >10080 | >10080 | >10080 | >10080 |
| mode | | pop | pop | — | — | — | — |

| | | Ex. 11 | Ex. 12 | Ex. 13 | Ex. 14 | Ex. 15 | Ex. 16 |
|---|---|---|---|---|---|---|---|
| monomer (1) | BA | 29 | 37 | 35 | 33 | 30 | 39 |
| | 2EHA | 21 | 21 | 21 | 21 | 17 | 21 |
| monomer (2) | DMAA | | | | | | |
| | NVP | 30 | 32 | 34 | 36 | 22 | 29 |
| monomer (3) | BzA | 20 | 10 | 10 | 10 | 30 | |
| | CHA | | | | | | 10 |
| monomer (4) | AA | 0 | 0 | 0 | 0 | 1 | 1 |
| Initiator | Irgacure 651 | 0.04 | 0.04 | 0.04 | 0.04 | 0.04 | 0.04 |
| | | 0.1 | 0.1 | 0.1 | 0.1 | 0.1 | 0.1 |
| crosslinker | HDDA | 0.06 | 0.06 | 0.06 | 0.06 | 0.08 | 0.06 |
| 180 deg. Peel at 25 dc (N/12 mm) | | 24.5 | 26 | 26.5 | 30.5 | 18.5 | 23.5 |
| mode | | pop | pop | pop | pop | pop | pop |
| 180 deg. Peel at 80 dc (N/12 mm) | | 14.5 | 13.5 | 18.5 | 17.5 | 13 | 13 |
| mode | | FB | FB | FB | FB | FB | FB |
| 180 deg. Peel at 5 dc (N/12 mm) | | 6.2 | 6.5 | 4.3 | 1.9 | 3.3 | 5.5 |
| mode | | pop | pop | pop | pop | pop | pop |
| Static shear test (min/12 mm × 25 mm) | | >10080 | >10080 | >10080 | >10080 | 9999 | >8000 |
| mode | | — | — | — | — | pop | — |

TABLE 3

| | | Cex. 4 | Cex. 5 | Cex. 6 | Ex. 17 | Ex. 18 | Ex. 19 | Cex. 7 | Cex. 8 |
|---|---|---|---|---|---|---|---|---|---|
| monomer (1) | BA | 0 | 8 | 13 | 18 | 28 | 33 | 38 | 49 |
| | 2EHA | 49 | 41 | 36 | 31 | 21 | 16 | 11 | 0 |
| monomer (2) | DMAA | 30 | 30 | 30 | 30 | 30 | 30 | 30 | 30 |
| | NVP | | | | | | | | |
| monomer (3) | BzA | 20 | 20 | 20 | 20 | 20 | 20 | 20 | 20 |
| | CHA | | | | | | | | |
| monomer (4) | AA | 1 | 1 | 1 | 1 | 1 | 1 | 1 | 1 |
| Initiator | Irgacure 651 | 0.04 | 0.04 | 0.04 | 0.04 | 0.04 | 0.04 | 0.04 | 0.04 |
| | | 0.1 | 0.1 | 0.1 | 0.1 | 0.1 | 0.1 | 0.1 | 0.1 |
| crosslinker | HDDA | 0.08 | 0.08 | 0.06 | 0.08 | 0.08 | 0.06 | 0.08 | 0.08 |
| 180 deg. Peel at 25 dc (N/12 mm) | | 26.5 | 25.5 | 22 | 25.8 | 23.3 | 21 | 26.8 | 23.3 |
| mode | | pop | pop | pop | pop | pop | pop | pop | pop |
| 180 deg. Peel at 80 dc (N/12 mm) | | 16.6 | 18.6 | 15.5 | 14.4 | 14.5 | 14 | 21 | 16 |
| mode | | pop | pop | FB | FB | FB | FB | FB | FB |
| 180 deg. Peel at 5 dc (N/12 mm) | | 2.8 | 2.8 | 2.8 | 2.8 | 2.8 | 2.6 | 1.2 | 0.8 |
| mode | | pop | pop | pop | pop | pop | pop | pop | pop |
| Static shear test (min/12 mm × 25 mm) | | 2694 | 1901 | 1828 | >10080 | >10080 | >10080 | >10080 | >10080 |
| mode | | pop | pop | pop | pop | pop | — | pop | — |

TABLE 4

| | | Cex. 9 | Cex. 10 | Cex. 11 | Ex. 20 | Ex. 21 | Ex. 22 |
|---|---|---|---|---|---|---|---|
| monomer (1) | BA | 0 | 5 | 11 | 15 | 31 | 51 |
| | 2EHA | 51 | 46 | 41 | 36 | 21 | 0 |
| monomer (2) | DMAA | | | | | | |
| | NVP | 28 | 28 | 28 | 28 | 28 | 28 |
| monomer (3) | BzA | 20 | 20 | 20 | 20 | 20 | 20 |
| | CHA | | | | | | |
| monomer (4) | AA | 0 | 0 | 0 | 0 | 0 | 0 |
| Initiator | Irgacure 651 | 0.04 | 0.04 | 0.04 | 0.04 | 0.04 | 0.04 |
| | | 0.1 | 0.1 | 0.1 | 0.1 | 0.1 | 0.1 |
| crosslinker | HDDA | 0.06 | 0.06 | 0.06 | 0.06 | 0.06 | 0.06 |
| 180 deg. Peel at 25 dc (N/12 mm) | | 26.3 | 25.5 | 23.3 | 24 | 26.3 | 22.5 |
| mode | | pop | pop | pop | pop | pop | pop |
| 180 deg. Peel at 80 dc (N/12 mm) | | 16.2 | 18.6 | 20 | 21.5 | 14.8 | 12.5 |
| mode | | FB | FB | FB | FB | FB | FB |

TABLE 4-continued

|  | Cex. 9 | Cex. 10 | Cex. 11 | Ex. 20 | Ex. 21 | Ex. 22 |
|---|---|---|---|---|---|---|
| 180 deg. Peel at 5 dc (N/12 mm) | 9.1 | 8 | 8.3 | 7.8 | 7.9 | 3.4 |
| mode | pop | pop | pop | pop | pop | pop |
| Static shear test (min/12 mm × 25 mm) | 1871 | 3447 | 1135 | 5163 | >10060 | >10060 |
| mode | pop | pop | pop | pop | — | — |

TABLE 5

|  |  | Ex. 23 | Ex. 24 |
|---|---|---|---|
| monomer (1) | BA | 31 | 29 |
|  | 2EHA | 21 | 21 |
| monomer (2) | NVP | 26 |  |
|  | NVC |  | 30 |
| monomer (3) | BzA | 20 | 20 |
| monomer (4) | AA |  | 2 |
| crosslinker | Bis Aziridine | 0.2 |  |
|  | HDDA |  | 0.06 |
| 180 deg. Peel at 23 dc (N/12 mm) |  | 21 | 20 |
| mode |  | pop | pop |
| 180 deg. Peel at 80 dc (N/12 mm) |  | 14 | 15 |
| mode |  | FB | FB |
| 180 deg. Peel at 5 dc (N/12 mm) |  | 1.7 | 2.5 |
| mode |  | pop | pop |
| Static shear test (min/12 mm × 25 mm) |  | >10000 | 9769 |
| mode |  | — | pop |

What is claimed is:

1. A pressure sensitive adhesive comprising a polymer obtained by polymerizing 100 mass parts of a monomer mixture comprising:
   46 to 53 mass parts of a monomer component (1) comprising an acrylate mixture selected from an aliphatic alkyl (meth) acrylate having a carbon number of 4 to 6 and an aliphatic alkyl (meth) acrylate having a carbon number of 7 to 12, wherein monomer component (1) has a mass ratio of the aliphatic alkyl (meth) acrylate having a carbon number of 4 to 6 to the aliphatic alkyl (meth) acrylate having a carbon number of 7 to 12 of 3:7 to 7:3;
   26 to 34 mass parts of a monomer component (2) selected from the group consisting of amide group-containing vinyl monomers expressed by Formula 1:

$CHR=CH-C(O)-N(R^1)R^2$ 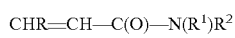 Formula 1:

wherein R is hydrogen or a methyl group; $R^1$ and $R^2$ are selected from hydrogen and linear or branched alkyl groups having a carbon number of 1 to 4, wherein $R^1$ and $R^2$ are not both hydrogen at the same time;
   10 to 30 mass parts of a monomer component (3) selected from the group consisting of esters of a non-tertiary aromatic alcohol and (meth) acrylic acid, and esters of a non-tertiary alicyclic alcohol and (meth) acrylic acid, wherein the monomer component (3) is such that a Tg of a homopolymer thereof is −25° C. or higher;
   0 to 3 mass parts of a monomer component (4) comprising (meth) acrylic acid;
   0.01 to 0.5 mass parts of a cross linking agent; and
   0.05 to 1.0 mass parts of a polymerization initiator.

2. An adhesive tape comprising a base material layer and an adhesive layer which comprises the pressure sensitive adhesive according to claim 1.

3. A structure comprising a base material layer, an adhesive layer which comprises the pressure sensitive adhesive according to claim 1, and a polymethylmethacrylate automotive exterior part.

4. A pressure sensitive adhesive comprising a polymer obtained by polymerizing 100 mass parts of a monomer mixture comprising:
   47 to 60 mass parts of a monomer component (1) comprising an acrylate mixture selected from an aliphatic alkyl (meth) acrylate having a carbon number of 4-6 and an aliphatic alkyl (meth) acrylate having a carbon number of 7-12, wherein monomer component (1) has a mass ratio of the aliphatic alkyl (meth) acrylate having a carbon number of 4-6 to the aliphatic alkyl (meth) acrylate having a carbon number of 7-12 of 2.5:7.5 to 10:0;
   26 to 36 mass parts of a monomer component (2) comprising an N-vinyl cyclic amide monomer;
   10 to 30 mass parts of a monomer component (3) selected from the group consisting of esters of a non-tertiary aromatic alcohol and (meth) acrylic acid, and esters of a non-tertiary alicyclic alcohol and (meth) acrylic acid, wherein the monomer component (3) is such that a Tg of a homopolymer thereof is −25° C. or higher;
   0 to 3 mass parts of a monomer component (4) comprising (meth) acrylic acid;
   0.01 to 0.5 mass parts of a cross linking agent; and
   0.05 to 1.0 mass parts of a polymerization initiator.

5. An adhesive tape comprising a base material layer and an adhesive layer which comprises the pressure sensitive adhesive according to claim 4.

6. A structure comprising a base material layer, an adhesive layer which comprises the pressure sensitive adhesive according to claim 4, and a polymethylmethacrylate automotive exterior part.

7. A polymerizable monomer mixture comprising:
   46 to 53 mass parts of a monomer component (1) comprising an acrylate mixture selected from an aliphatic alkyl (meth) acrylate having a carbon number of 4 to 6 and an aliphatic alkyl (meth) acrylate having a carbon number of 7 to 12, wherein monomer component (1) has a mass ratio of the aliphatic alkyl (meth) acrylate having a carbon number of 4 to 6 to the aliphatic alkyl (meth) acrylate having a carbon number of 7 to 12 of 3:7 to 7:3;
   26 to 34 mass parts of a monomer component (2) selected from the group consisting of amide group-containing vinyl monomers expressed by Formula 1:

$CHR=CH-C(O)-N(R^1)R^2$ 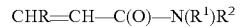 Formula 1:

wherein R is hydrogen or a methyl group; $R^1$ and $R^2$ are selected from hydrogen and linear or branched alkyl groups having a carbon number of 1 to 4, wherein $R^1$ and $R^2$ are not both hydrogen at the same time;
   10 to 30 mass parts of a monomer component (3) selected from the group consisting of esters of a non-tertiary aromatic alcohol and (meth) acrylic acid, and esters of a non-tertiary alicyclic alcohol and (meth) acrylic acid, wherein the monomer component (3) is such that a Tg of a homopolymer thereof is −25° C. or higher;
   0 to 3 mass parts of a monomer component (4) comprising (meth) acrylic acid;
   0.01 to 0.5 mass parts of a cross linking agent; and
   0.05 to 1.0 mass parts of a polymerization initiator.

8. A method of making a pressure sensitive adhesive comprising a step of polymerizing the monomer mixture according to claim 7.

* * * * *